Patented Jan. 13, 1953

2,624,932

UNITED STATES PATENT OFFICE 2,624,932

PROCESS OF FIRING SILICON CARBIDE CERAMIC PRODUCTS

John K. Sjogren, Shrewsbury, Mass., assignor to Norton Company, Worcester, Mass., a corporation of Massachusetts No Drawing. Application July 24, 1950,
Serial No. 175,651

3 Claims. (Cl. 25—157)

The invention relates to a process of firing silicon carbide ceramic products, and with regard to its more specific features to the firing of grinding wheels.

One object of the invention is to prevent the coring of such products. Another object of the invention is to produce good quality silicon carbide grinding wheels in the harder grades. Another object of the invention is to manufacture silicon carbide grinding wheels quickly, that is to say with a short firing cycle. Another object of the invention is to improve the quality of silicon carbide ceramic products. Another object of the invention is to shorten the time required for the manufacture of silicon carbide ceramic products. Another object of the invention is to produce silicon carbide products in recently developed electric tunnel kilns thereby to achieve economy in manufacture. Another object of the invention is to produce well matured ceramic bonded silicon carbide products with the use of a lower firing temperature.

Other objects will be in part obvious or in part pointed out hereinafter.

As conducive to a clearer understanding of the present invention it is pointed out that manufacturers of silicon carbide products have long been plagued with what is known as coring. Coring has been an especial problem in the manufacture of grinding wheels the abrasive of which is silicon carbide and the bond of which is vitrified ceramic bond. Coring may be described as a formation of darker areas or at least distinctively different areas in the wheels or other products. These distinctively different usually darker areas have usually been found in the interior of the wheels forming a sort of "core" having a different color and also different physical properties. This accounts for the name since the undesired darker interior portion seemed to be in the nature of a core and hence the phenomenon was called coring. This cored area or more properly volume has different physical characteristics and usually inferior characteristics for grinding. Customers soon learned to identify cored wheels and naturally expected allowances therefor.

Long ago it was found that coring could be substantially eliminated in many types of vitrified silicon carbide grinding wheels (these being ex vi termini silicon carbide products) by the selection of appropriate firing cycles, that is to say long firing cycles. But even this procedure did not entirely eliminate coring in the harder grades of wheels. Coring is more apt to occur or, when it does occur it is worse, in the harder grades of wheels. The harder grades of wheels are those having a relatively small percentage of porosity.

There has recently been perfected an electric tunnel kiln which can be set to various firing cycles. This tunnel kiln is fully described in applications Serial No. 747,169 and No. 747,170 filed May 10, 1947, and now U. S. Patents No. 2,523,025 and No. 2,519,250. At first tunnel kilns as described in the aforesaid patents were used to vitrify grinding wheels having aluminum oxide abrasive. When molded wheels with ceramic bond and having silicon carbide abrasive were put into kilns of this type they were successfully vitrified but many of them were found to be cored. By my invention a firing process for the manufacture of vitrified silicon carbide grinding wheels and other vitrified ceramic products has been provided which enables the wheels or other products to be vitrified in these improved electric tunnel kilns without coring and furthermore the process can be used in other kilns for the manufacture of any silicon carbide product where coring was a problem.

I have found that by providing an atmosphere of steam in the kilns coring is greatly reduced and in most cases completely eliminated. The best results are achieved by using a large percentage of steam and I could use as much as 100% steam only on a commercial scale it is difficult to obtain an atmosphere in a kiln which is 100% steam. I have succeeded in creating in the firing zone of an electric tunnel kiln according to the above patents an atmosphere which is as much as 95% steam by volume. However, good results are achieved using as little as 50% steam by volume and for some products as little as 30% steam by volume is satisfactory. Thus according to the invention the atmosphere in the kiln should be at least 30% steam by volume with no upper limit and a preferred figure is at least 50% steam by volume with no upper limit.

A particular tunnel kiln according to the above patents which I have successfully used to vitrify silicon carbide grinding wheels and so-called mounted points is 282 inches long (on the incline of the tunnel) and contains, when loaded, 66 batts each four and one-quarter inches from the leading to the trailing edge. The pre-heating zone of this kiln is 47 inches long (on the incline) and the firing zone is also 47 inches long (on the incline) leaving 188 inches for the annealing zone. The mechanism was set to ram two batts at a time into the tunnel every fifty-three minutes, twenty-seven seconds. Thus the first stroke of the ram would cause a pair of batts to enter the tunnel, and the thirty-third stroke would remove them at the exit end, a pair of batts being completely withdrawn from the kiln at every stroke of the ram.

It will be seen that after a pair of batts have been in the pre-heating zone four hours, twenty-seven minutes and fifteen seconds they will have been moved to a position partly in and partly short of the firing zone (five strokes of the ram). The entrance end of the kiln is at about 200° C. and the entrance end of the firing zone is at about 875° C. The ware rises in temperature by substantially even increments as it goes through the pre-heating zone. The third move after they are partly in and partly short of the firing zone will take the batts to about the middle of the firing zone where the temperature is at about 1270° C. By the time the ram moves the tenth time (when the ram rammed these batts into the tunnel it made the "first" move) the ware on the batts will have reached about 1260° C. Thus it takes the ware just about eight hours to rise from room temperature to 1260° C. For about one hour and forty-seven minutes (two moves) the ware stays at this top temperature of 1260° C. and then (next move) goes out of the firing zone. Annealing is from this twelfth move to the thirty-third move which moves the batts out of the tunnel and thus takes eighteen hours, forty-two minutes and twenty-seven seconds and the drop in temperature is to about 100° C. which is the temperature of the ware as it emerges from the kiln.

The steam was introduced into the kiln in the annealing zone about 25 inches from the firing zone. An oxidation resistant ferrous metal pipe extended horizontally across the tunnel just above the ware and had a row of $\frac{1}{16}''$ holes about six in number and located on the horizontal diameter to direct the steam toward the entrance end of the kiln, that is toward the firing zone in more or less of a horizontal plane. It is not possible for me to give details on the quantity of steam used because it is very difficult to measure the amount of discharge through the orifices. However, I am able to calculate the volume percentage of the steam in the firing zone by withdrawing some of this atmosphere and analyzing it for steam content. As previously stated, I prefer an atmosphere having 50 volume per cent steam and excepting when experimenting to find the minimum amount of steam useful in the invention I have kept the atmosphere in the kiln at 50 volume per cent of steam and above. The 50 volume per cent steam atmosphere existed at all times in all of the firing zone of the kiln since in this kiln and others like it there is a steady draft from the annealing zone through the firing zone through the pre-heating zone and up a stack at the entrance end of the kiln. Naturally enough a steam atmosphere existed in the pre-heating zone at least to very close to the entrance end but there was 30% or more by volume of air in the pre-heating zone from the entrance end up to the place where the articles had been heated to the temperature of 400° C. In the wheels and other products being vitrified there was and in the future may be a certain amount of wax functioning in part as a temporary binder; this is burned out in the pre-heating zone of the kiln and the steam did not materially change the rate of burning of the wax, there having been sufficient air for the purpose.

I have vitrified a number of different products in accordance with this invention and I will now describe the products. Each product comprised a great many individual articles, in some cases thousands. In every case the bond was according to Table I.

*Table I*

|  | Per cent |
|---|---|
| Feldspar | 48 to 62 |
| Borosilicate frit | 4 to 12 |
| Ball clay | 17 to 40 |
| Flint (quartz) | none to 25 |

In the above table all parts are by weight.

EXAMPLE I

A number of grinding wheels were vitrified in accordance with the above described firing cycle. These wheels had 54 volume per cent of 24 grit size silicon carbide abrasive, 26.2 volume per cent of bond according to Table I and the remainder pores. Each wheel was 7 inches in diameter, 1½ inches thick with a 1½ inch central hole. Steam in accordance with the foregoing description was introduced into the kiln and no cored wheels were found. From experience I know that if the steam had not been used some or most of the wheels would have been cored.

EXAMPLE II

A number of grinding wheels were vitrified in accordance with the above described firing cycle. These wheels had 54 volume per cent of 24 grit size silicon carbide abrasive, 24.6 volume per cent of bond according to Table I and the remainder pores. Each wheel was 7 inches in diameter, 1½ inches thick with a 1½ inch central hole. Steam in accordance with the foregoing description was introduced into the kiln and no cored wheels were found. From experience I know that if steam had not been used some or most of the wheels would have been cored.

EXAMPLE III

A number of grinding wheels were vitrified in accordance with the above described firing cycle. These wheels had 48 volume per cent of 100 grit size silicon carbide abrasive, 21.5 volume per cent of bond according to Table I and the remainder pores. Each wheel was 7 inches in diameter, 1½ inches thick with a 1½ inch central hole. Steam in accordance with the foregoing description was introduced into the kiln and no cored wheels were found. From experience I know that if the steam had not been used many or most of the wheels would have been cored.

EXAMPLE IV

A number of grinding wheels were vitrified in accordance with the above described firing cycle. These wheels had 54 volume per cent of 20 grit size silicon carbide abrasive, 26.2 volume per cent of bond according to Table I and the remainder pores. Each wheel was 7 inches in diameter, 1½ inches thick with a 1½ inch central hole. Steam in accordance with the foregoing description was introduced into the kiln and no cored wheels were found. From experience I know that if the steam had not been used, many or most of these wheels would have been cored.

EXAMPLE V

A number of mounted points were vitrified in accordance with the above described firing cycle. These points had 54 volume per cent of 36 grit size silicon carbide abrasive, 22.5 volume per cent of bond according to Table I and the remainder pores. Each point was 1¾ inches in diameter and 3 inches long. Steam in accordance with the foregoing description was introduced into the kiln and no core points were found. From experience I know that if the steam had not been used, many or most of these points would have been cored. I suppose it is known to those skilled in the art that by "mounted points" I mean abrasives which are bodies of revolution and are cemented to a spindle, usually steel, having an axis coinciding with the axis of revolution, and these are customarily referred to as "mounted points" although of course the term is a misnomer until the bodies are cemented to the spindle at which time the term becomes appropriate.

EXAMPLE VI

A number of mounted points were vitrified in accordance with the above described firing cycle. These points had 54 volume per cent of 24 grit size silicon carbide abrasive, 22.5 volume per cent of bond according to Table I and the remainder pores. Each point was 1¾ inches in diameter and 3 inches long. Steam in accordance with the foregoing description was introduced into the kiln and no cored points were found. From experience I know that if the steam had not been used, many or most of these points would have been cored.

EXAMPLE VII

A number of mounted points were vitrified in accordance with the above described firing cycle. These points had 48 volume per cent of 36 grit size silicon carbide abrasive, 26.6 volume per cent of bond according to Table I and the remainder pores. Each point was ¾ of an inch in diameter and 2½ inches long. Steam in accordance with the foregoing description was introduced into the kiln and no cored points were found. From experience I know that if the steam had not been used, many or most of these points would have been cored.

In every one of these examples the bond was well developed and thoroughly practical and useful articles were produced. In fact they were very high class articles. On information and belief practically all of the grinding wheels and mounted points produced in accordance with the seven examples, and there were many thousand total articles, were sold in the regular course of business to customers of the manufacturer who owned the tunnel kiln.

A total time for vitrifying silicon carbide articles involving twenty-eight to thirty hours is a relatively short time compared to the amount of time previously used for the successful vitrification of uncored silicon carbide grinding wheels. It has always taken longer to vitrify silicon carbide products than to vitrify aluminum oxide products. However I am not limited to any firing cycle as shorter firing cycles may be developed especially for other ceramic bond formulae.

The amount of silicon carbide in grinding wheels and mounted points may vary from 40 volume per cent to 60 volume per cent but as much as 98% of silicon carbide by volume is used in the manufacture of certain refractories which have, after firing, up to 85% by volume or even up to 87% by volume of silicon carbide. The invention is definitely useful in the manufacture of silicon carbide refractories to prevent coring. So far as the porosity of the products is concerned it may be anything that can be achieved. In other words the volume percentage of porosity depends upon other factors and the invention is not in anywise limited to any particular range of porosities. While coring had especially been noted in silicon carbide products made with bond according to Table I, the invention will nevertheless prevent coring in silicon carbide products bonded with other types of ceramic bond and coring has not been limited to products made from any particular type of ceramic bond in the past.

I am unable to assign a definite reason why the provision of a steam atmosphere in the kiln prevented the coring of the silicon carbide products vitrified therein. It may be due to the fact that steam at high temperatures is a powerful oxidizing agent; it may be because of a partial dissociation of water vapor with the result that molecular hydrogen combines with any carbon formed by the oxidation of the silicon carbide during the firing; it may be on account of a reaction of the nature of the water gas reaction. On the other hand the success of the process may be due to none of these reasons. This particular kiln and others like it contain recrystallized silicon carbide electrical resistor heating rods or bars which provide the heat. Immediately after steam was introduced into the kiln these bars started to deteriorate and soon many of them had to be replaced. These recrystallized silicon carbide bars contain substantially no ceramic bond; they are composed almost entirely of silicon carbide in the hot zones thereof and of silicon carbide impregnated with silicon in the cold ends thereof. This deterioration of the heating bars did not, however, interfere with the adoption and use of the process since a remedy for this difficulty was found; the recrystallized silicon carbide bars were enclosed in tubes of sintered alumina and the difficulty promptly disappeared.

Having thus explained the nature of the invention I will now endeavor to explain its scope. The invention is useful for preventing coring in any silicon carbide product made from grain and by grain I mean crushed or comminuted silicon carbide from which articles are made by uniting the individual granules in some manner. The problem of coring has not, however, been met with in the manufacture of recrystallized silicon carbide products since these have been made in a reducing atmosphere. The problem then has existed where the atmosphere has been oxidizing and it is strange indeed that the solution is to make the atmosphere more oxidizing. So-called vitrified silicon carbide products have been made in periodic kilns and tunnel kilns where the atmosphere is oxidizing. These products are made from a mixture of silicon carbide grains and at least a small amount of ceramic bonding material. Sometimes this is as little as 1% by weight, for silicon carbide refractories can be made out of silicon carbide grain using 1% of bentonite. In other cases as in the examples herein and especially for the manufacture of grinding wheels a greater portion of ceramic material is used. By ceramic material in this connection I mean clay or clays, rock or rocks, frit or frits or any mixture of two or all three of these. Chemically these mixtures are oxides and mixtures of oxides.

In the manufacture of ceramic products "green" dry strength is wanted and in order to obtain it a small proportion of combustible temporary binder is usually used, for example any sticky organic substance such as a water solution of dextrine. This water solution of dextrine can be defined as combustible organic material in flowable condition. However ceramic articles can be made without using any temporary binder.

More recently it has been found that moldability and "green" dry strength are improved by adding wax in flowable condition to the mixture. It is the physical properties of the wax rather than the chemical properties thereof that are important. Wax in this connection is any substance which is 1. Substantially completely combustible under 600° C.
2. Unctuous
3. Highly plastic and deformable
4. Lacking in tensile strength
5. Cohesive but only slightly adhesive
6. Possessing a high coefficient of friction
7. Non-elastic
8. Crystalline
9. Solid at room temperature
10. Fusible under 300° F.

Examples of these waxes are as follows:

*Table II*

| Wax | Origin | Chemistry | Melting Point, °F. |
|---|---|---|---|
| Carnauba | Vegetable | Fatty Acid Glyceride | 183. |
| Japan wax | do | do | 130. |
| Ceresin | Mineral | Hydrocarbon | Around 170. |
| Montan | do | do | 175. |
| Paraffin | do | do | Various. |
| Halowax | Synthetic | Chlorinated Diphenyl | 194. |
| Rilan wax | do | Chlorinated Hydrocarbon | 183. |
| Acrawax | do | Amide Fatty Acid and Ethylene Diamine. | 275. |
| Water Soluble Wax | do | Poly Ethylene Glycol (molecular weight 4,000). | 130. |
| Beeswax | Animal | Fatty Acid Glyceride | 130. |
| Candellila | Vegetable | do | 130. |

For the manufacture of grinding wheels using wax to promote moldability the wax is first mixed with the silicon carbide grain. A solution of the wax in organic solvent or, in the case of polyethylene glycol in water can be used to coat the grains with flowable wax. Another method is to melt the wax. However the preferred method is to make a water emulsion of the wax such as a water emulsion of the ceresin wax of Table II. The silicon carbide grains coated with wax are then mixed with powdered ceramic bond until each coated particle has picked up the desired quantity of bond. This of course is done by weighing out the required amount of bond and continuing the mixing until the wax coated particles have picked up all the bond. After drying and screening the mixture is ready for molding. A quantity of the mixture, the exact quantity being carefully calculated to produce the desired grade and structure of the wheels as set forth in the examples, is then charged into a steel mold and pressed under heavy pressure to a predetermined volumetric displacement. The mold is then stripped and the article can now be handled and is known as a "green" article. The green articles are then fired as previously explained. During the pre-heating stage, that is while the articles are being raised toward the firing temperature, the wax included therein burns. It is therefore important, wherever there is present a material amount of temporary organic binder such as wax and also in the case of dextrine or other carbohydrates to leave some air in the kiln in the pre-heating zone to burn out the organic products. I have found that 30% of air by volume in that portion of the pre-heating zone where the articles are at 400° C. or below is sufficient for the purpose. According to one aspect of the present invention, therefore, the method involves the provision of at least 30% by volume of air in that portion of the kiln where the articles are 400° C. and below. In cases where the products are made without the use of any organic temporary binder it will not be necessary to have any air in the atmosphere of the kiln but it is difficult to get rid of all air in any event. The products of the examples hereinbefore given contained wax when these products were in the "green" state, the mixtures having been made with the use of a water emulsion of ceresin wax as explained. This also, as well as a solution of wax or melted wax can be defined as combustible organic material in flowable condition.

Ceramic bonded vitrified products have been made using firing temperatures well below 1200° C. in fact as low as 850° C. Coring has heretofore been experienced in the manufacture of such products. The use of a steam atmosphere containing at least 30 volume per cent of steam will prevent coring during the vitrification of these ceramic silicon carbide products using low firing temperatures. I have also found that the use of steam as described permits the lowering of the firing temperature by as much as 20° yet obtaining the same degree of maturity of the bond. However for the manufacture of grinding wheels out of the bond of Table I a firing temperature rising to at least 1200° C. is preferred and to prevent coring the atmosphere should be at least 30% steam by volume from after the time the wheel has reached 1000° C. until it has dropped to 1150° C. again. In cases where the firing temperature is below 1200° C. it will suffice to have the specified atmosphere of steam during all times that the articles are within 100° C. of the ultimate top temperature.

It will thus be seen that there has been provided by this invention a method for the prevention of coring of silicon carbide ceramic products in the course of firing such silicon carbide ceramic products in accordance with which the objects hereinbefore set forth together with many thoroughly practical advantages are successfully achieved. As the invention may be practiced for the manufacture of many different silicon carbide articles and as the art herein described may be varied in various parts, all without departing from the scope of the invention, it is to be understood that all matter hereinabove set forth is to be interpreted as illustrative and not in a limiting sense.

I claim:

1. Process of making silicon carbide ceramic products which comprises mixing silicon carbide in the form of grain with powdered ceramic material and a temporary combustible organic binder in flowable form, charging a mold with the mixture, exerting pressure on the mixture in the mold, removing the resulting green piece from the mold, then gradually raising the green piece to a temperature of at least 1200° C. in an atmosphere which up to the time the piece reaches 400° C. is at least 30% air and by the time the piece reaches 1000° C. is at least 30% steam.

2. Process of making silicon carbide products which comprises mixing silicon carbide grain with combustible organic material in flowable condition and with powdered vitrifiable ceramic bonding material, charging a mold with the mixture, exerting pressure on the mixture in the mold, then removing the resulting green piece from the mold, then heating the green piece to 400° C. in an atmosphere containing at least 30% by volume of air, then firing the green piece by raising it to a temperature of at least 850° C. in an atmosphere which is at least 30% by volume of steam.

3. Process of making silicon carbide products which comprises mixing silicon carbide grain with combustible organic material in flowable condition and with powdered vitrifiable ceramic bonding material, charging a mold with the mixture, exerting pressure on the mixture in the mold, then removing the resulting green piece from the mold, then raising the temperature of the green piece to 400° C. in an atmosphere of at least 30% by volume of air, then firing the piece by raising the temperature to at least 1200° C. in an atmosphere which is at least 30% steam by volume from after the time the piece has reached 1000° C. until it has dropped to 1150° C. again.

JOHN K. SJOGREN.

REFERENCES CITED

The following references are of record in the file of this patent:

UNITED STATES PATENTS

| Number | Name | Date |
|---|---|---|
| 2,097,620 | Harris | Nov. 2, 1937 |